(12) United States Patent
Rekunyk (10) Patent No.: US 11,086,280 B2
(45) Date of Patent: Aug. 10, 2021

(54) METHOD AND SYSTEM FOR STORING NATURAL GAS AND NATURAL GAS LIQUIDS VIA A VARIABLE VOLUME FLOW SPLITTER FROM A PRODUCING FIELD

(71) Applicant: Jeffrey Carl Rekunyk, Calgary (CA)

(72) Inventor: Jeffrey Carl Rekunyk, Calgary (CA)

( * ) Notice: Subject to any disclaimer, the term of this patent is extended or adjusted under 35 U.S.C. 154(b) by 111 days.

(21) Appl. No.: 16/589,268

(22) Filed: Oct. 1, 2019

(65) Prior Publication Data

US 2020/0133212 A1    Apr. 30, 2020

(30) Foreign Application Priority Data

Oct. 29, 2018   (CA) .................... CA 3022441

(51) Int. Cl.
| | | |
|---|---|---|
| *G05B 15/02* | (2006.01) | |
| *B65G 5/00* | (2006.01) | |
| *G06Q 50/06* | (2012.01) | |

(52) U.S. Cl.
CPC ............... *G05B 15/02* (2013.01); *B65G 5/00* (2013.01); *G06Q 50/06* (2013.01)

(58) Field of Classification Search
CPC .......... G05B 15/02; B65G 5/00; G06Q 50/06; F17D 3/18; F17D 3/01
See application file for complete search history.

(56) References Cited

U.S. PATENT DOCUMENTS 3,848,427 A  *  11/1974  Loofbourow ........... F17C 3/005
                                                         62/260
4,821,524 A  *   4/1989  Kostyal ................ B01D 5/0012
                                                         62/47.1
(Continued)

FOREIGN PATENT DOCUMENTS

| AU | 772688  | 5/2004 |
|---|---|---|
| CA | 2424745 | 4/2003 |

(Continued)

OTHER PUBLICATIONS

U.S. EPA Office of Air Quality Planning and Standards (OAQPS), "Oil and Natural Gas Sector Hydraulically Fractured Oil Well Completions and Associated Gas during Ongoing Production", Report for Oil and Natural Gas Sector, pp. 30-37, https://www.ourenergypolicy.org/wp-content/uploads/2014/04/epa-fracking.pdf, Apr. 2014 (Apr. 2014).

(Continued)

*Primary Examiner* — Ramesh B Patel (57) ABSTRACT

Method and system for storing natural gas and natural gas liquids via a variable volume flow splitter from a producing field. A method and system comprising storing natural gas and natural gas liquids while simultaneously selling natural gas and natural gas liquids from a single compressor in quantities as deemed desirable. In response to desired quantities to be injected into a storage reservoir or sold, the system provides a single action (e.g., a single action such as the click of a mouse button) that splits the gas stream into injection for storage and the sales pipeline for transportation to market by adjusting a flow splitter of a single value or valves in combination operated remotely or manually on the downstream side of the sales gas compressor that varies the volume to any combination and ratio from 0 to 100% of gas and entrained gas liquids to be sold or injected.

20 Claims, 7 Drawing Sheets

(56) References Cited

U.S. PATENT DOCUMENTS

| | | | | |
|---|---|---|---|---|
| 5,707,424 | A * | 1/1998 | Tom | F17C 11/00 95/95 |
| 6,210,464 | B1 * | 4/2001 | Nakanishi | B01D 63/027 95/52 |
| 6,236,894 | B1 * | 5/2001 | Stoisits | G05B 13/0265 166/52 |
| 6,581,618 | B2 * | 6/2003 | Hill | B65G 5/00 137/1 |
| 6,840,709 | B2 * | 1/2005 | Dahlem | E21F 17/16 405/53 |
| 7,322,387 | B2 * | 1/2008 | Landry | F17C 7/04 141/11 |
| 9,228,415 | B2 * | 1/2016 | Ingham | E21B 41/00 |
| 2003/0051875 | A1 * | 3/2003 | Wilson | B65G 5/005 166/268 |
| 2003/0061820 | A1 * | 4/2003 | Bishop | F17C 3/025 62/45.1 |
| 2005/0061395 | A1 * | 3/2005 | Pollack | F17C 9/00 141/388 |
| 2006/0004593 | A1 * | 1/2006 | Seat | B63B 35/44 705/1.1 |
| 2008/0127655 | A1 | 6/2008 | Landry et al. | |
| 2012/0047942 | A1 * | 3/2012 | Kolodziej | B63B 27/24 62/611 |
| 2012/0180502 | A1 * | 7/2012 | Morris | F17C 11/007 62/47.1 |
| 2015/0211684 | A1 * | 7/2015 | Santos | F17C 5/06 137/1 |
| 2018/0283148 | A1 * | 10/2018 | Ortiz | G05D 16/2026 |

FOREIGN PATENT DOCUMENTS

| | | |
|---|---|---|
| CA | 2714318 | 3/2005 |
| CA | 3022441 | 2/2021 |

OTHER PUBLICATIONS

U.S. Energy Information Administration, "The Basics of Underground Natural Gas Storage", EIA.gov, pp. 1-5, https://www.eia.gov/naturalgas/storage/basics/, Nov. 16, 2015 (Nov. 16, 2015).

Gas storage industry primer: https://www.slideshare.net > SimonJacques1 > gas-storage-industry-primer . . . Dec. 18, 2016—Gas storage industry primer-Niska. Gas storage industry primer Gas storage industry primer. Industry overview General Underground natural gas storage facilities are a vital and complementary component of the North American natural gas transmission and distribution system.

* cited by examiner

METHOD AND SYSTEM FOR STORING NATURAL GAS AND NATURAL GAS LIQUIDS VIA A VARIABLE VOLUME FLOW SPLITTER FROM A PRODUCING FIELD

Method and system for storing natural gas and natural gas liquids via a variable volume flow splitter from a producing field.

FIELD OF THE INVENTION

The present invention relates to a storage method and system for natural gas and natural gas liquids and, more particularly, to a method and system for storing and optimising when the natural gas and natural gas liquids components are sold and, more particularly before to a method that allows simultaneous injection of a natural gas and natural gas liquids stream into storage and sales in desired quantities from a single compressor by a variable volume flow splitter.

BACKGROUND OF THE INVENTION

Canadian Patent Application No. 3,022,441 (Rekunyk, Jeffrey C.) entitled "Method and system for storing natural gas and natural gas liquids via a variable volume flow splitter from a producing field," which is hereby incorporated by reference, describes a source addition to offshore production facilities, fixed or floating, onshore production facilities and sales compressors to be used additionally for storing natural gas and natural gas liquids from a producing field. The described process allows these offshore production facilities, fixed or floating, onshore production facilities and sales compressors to be retrofitted and incorporated in new facilities construction to also allow simultaneous injection of a natural gas and natural gas liquids stream into storage and sales in desired quantities from a single compressor by a variable volume flow splitter.

There will hereinafter be described an alternative source in addition to the plurality of sources for receiving natural gas and/or natural gas liquids for injection into storage for offshore producing fields with fixed or floating production facilities, described in the Canadian Patent Application No. 3,022,441 to also receive natural gas and/or natural gas liquids via LNG and/or LPG when not connected to the shore via pipeline.

Natural gas is traditionally stored in a gaseous form in depleted stratigraphic traps, structural traps, large volume salt caverns and aquifers to meet peak demand and ensure a secure supply. Traditional storage is owned by midstream, pipeline companies and marketing companies who have access through those parties on a mutually beneficial contractual basis. The gas is added into storage at locations along transmission pipelines by compression and varying volumes of natural gas liquids will have been removed from the gas stream before and during transportation along the gathering and main gas transmission network. Natural gas and natural gas liquids storage is important and valuable infrastructure used to fulfill the obligations of gas distribution companies among other benefits, to provide a reliable supply of gas and the ability to balance supply and demand of pipeline capacity up and down the transmission line network.

Moreover, traditional storage allows midstream, pipeline transmission and marketing companies with firm transportation capacity or space on the gathering and transmission pipelines to take advantage of seasonal price differences and supply demand advantaged prices. Upstream producers do not have the ability to use traditional storage effectively, if at all, due to the cost of services using third party storage which includes but is not limited to, operating costs and the intrinsic value of storage charged which is calculated from the storage volume used or rented based on the difference between summer and winter gas prices at a given time storage is quoted. Therefore, it is cost prohibitive and risky for the upstream producers on the difference between summer and winter gas prices at a given time storage is quoted. Therefore, it is cost prohibitive and risky for the upstream producers to use traditional storage. Typical storage of this type, 4 drawings are shown, for example, in FIG. 1A-D which are schematic diagrams that represent the typical method presently used to compress gas for storage in the typical types of storage reservoirs.

Producers who have incurred all the risk capital of developing the resource are relegated to being price takers or shutting in the production which is not a viable option as you lose your cash flow and your ability to generate revenue from the higher value natural gas liquids.

SUMMARY OF THE INVENTION

According to one aspect of the present invention, there is provided a system for selectively storing and selling a gas stream, the gas stream comprising of at least one of natural gas and natural gas liquids, the system comprising: a sales transmission pipeline for transporting the gas stream from a plurality of sources to market; at least one producing field, the at least one producing field containing an extractable supply of the gas stream; a compressor, in fluid communication with both the at least producing field and the sales transmission pipeline; the compressor operable to compress the gas stream received; a variable volume flow splitter in fluid communication with the compressor, the variable volume flow splitter operable to selectively divide the gas stream into a first volume of the at least one natural gas and natural gas liquids and a second volume of the gas stream; and wherein the first volume of the gas stream is diverted into the sales transmission pipeline and the second volume of the gas stream is diverted into the at least one producing field.

According to another aspect of the present invention, there is provided A method for selectively storing and selling a gas stream, the gas stream comprising at least one of natural gas and natural gas liquids the method comprising: receiving at a compressor, a first supply of the gas stream from a sales transmission pipeline operable to transport the gas stream from a plurality of sources to market; receiving at the compressor, a second supply of the gas stream extracted from a producing field; compressing the first supply of the gas stream and the second supply of the gas stream at the compressor; using a variable volume flow splitter, splitting the gas stream compressed by the compressor into a first volume of the gas stream and a second volume of the gas stream; and wherein the first volume of the gas stream is diverted into the sales transmission pipeline and the second volume of the gas stream is diverted into the at least one producing field.

According to another aspect of the present invention, there is provided a method in the system, the method comprising; being able to produce natural gas to meet minimum third party transportation and sales commitments (e.g., take or pay contracts) from an oil or natural gas field and to be able to remove only some or all of the higher value natural gas liquids components for sale in low natural gas prices. Further in addition to natural gas, natural gas liquids components can be stored during low price periods and both can be sold later together or separately when it is price advantageous to do so making the value of reserves and return on capital invested higher.

According to still another aspect of the present invention, there is provided a method in the system for storing Y grade natural gas liquids (raw, unseparated Hydrocarbon gas liquids (HGL)), the method comprising; being able to receive and inject Y grade HGL from the gas processing system and, then injected through a multiphase high pressure pump to combine the HGL into the downstream injection side stream of the variable volume flow splitter for injection into storage.

According to yet another aspect of the present invention, there is provided a method in the system for increased recovery of oil and natural gas liquids in a producing field, the method comprising; injecting and storing a portion or all of the natural gas and HGL's back into the producing oil and or gas field, with or without supplemented volumes, supports and maintains the reservoir's pressure resulting in an additional 20 to 100 percent recovery of oil and HGL's that are normally left behind in the reservoir as a result of the producing field's pressure depletion. Further this adds an intrinsic value of the storage to the producing reservoir in price optimization and an increase in reserves net present value.

According to a further aspect of the present invention, there is provided a method in the system for increasing the recovery of oil and natural gas liquids in an up hole reservoir or field depleting or depleted used for storage, the method comprising; injecting and storing natural gas and HGL's into a separate up hole, or otherwise, oil and or gas reservoir, where the gas stream is received from a separate producing tight, or shale reservoirs where injection pressures are prohibitive to reinject natural gas and HGL's back into the producing reservoir. Whereby injecting natural gas and HGL's in depleting or depleted reservoir's for storage increases the reservoir pressure and supports an additional 20 to 100 percent recovery of HGL's and oil that are normally left behind in the depletion of a reservoir. Further this adds an intrinsic value of the storage to the injection reservoir.

According to yet a further aspect of the present invention, there is provided a method in the system for increased recovery of oil and natural gas liquids in a depleting or depleted field, the method comprising; by injecting natural gas and or natural gas liquids for storage, acquired from a transmission pipeline or floating storage and off loading vessels offshore from a plurality of sources including but not limited to LNG (predominantly C1, methane and C2, ethane) and/or LPG (predominately C3, propane and C4, butane), by purchase or swapped with a producers existing gas and gas liquids production in other regions, and by injecting to store natural gas and/or natural gas liquids into a depleted or depleting oil or gas field increases pressure and supports an additional 5 to 100 percent recovery of oil and HGL's that are normally left behind in the depletion of a reservoir and; the system adds intrinsic storage value to the reservoir. In addition to natural gas, natural gas liquids components that can be stored during low price periods whereby both can be sold later together or separately when it is price advantageous to do so making the value of the existing reserves and return on capital invested higher.

BRIEF DESCRIPTION OF THE DRAWINGS

These and other features of the of the invention from the following description in which references made to the appended drawings, the drawings are for the purpose of illustration only and are not intended to in any way limit the scope of the invention to the particular embodiment or embodiments shown, wherein.

DETAILED DESCRIPTION OF TYPICAL STORAGE AND OF THE INVENTION

The typical storage method that presently is used to compress gas for storage in a dedicated storage reservoir will now be described with reference to FIG. 1A-D.

In this typical storage process, gas is supplied from a main gas gathering or transmission pipeline 1, stream 2 enters the compressor 3 suction where it is compressed and discharged through line 4 into wells or well 5 into a depleted stratigraphic trap reservoir 6A (FIG. 1A), or depleted structural reservoir 6B (FIG. 1B), or structural aquifer 6C (FIG. 1C), or cavern 6D (FIG. 1D) for storage. The stored gas exits storage 6A-6D through well or wells 7 to line 8 suction where it is compressed 9 to sales line 10 back into main the main gathering or transmission pipeline 1.

An embodiment of the present invention provides a method and system for storing natural gas and natural gas liquids while simultaneously selling natural gas and natural gas liquids from a single compressor in quantities as deemed desirable. In response to the desired quantities to be injected into a storage reservoir or sold, the system provides a single action (e.g., a single action such as the click of a mouse button) that splits the gas stream into injection for storage and to the sales pipeline for transportation to market by adjusting a flow splitter of a single value or valves in combination operated remotely or manually on the downstream side of the sales gas compressor that varies the volume to any combination and ratio from 0 to 100% of gas and entrained gas liquids to be sold or injected.

One skilled in the art would appreciate that the variable volume single action flow splitter method and system for storing natural gas and natural gas liquids can be used in various environments other peak supply demand and pipeline capacity balancing. For example, pipeline capacity may be limited or completely restricted to a producer due to inadequate sizing pending new capacity being added caused by increased production form a producing region. In response to, but not limited to pipeline restrictions, natural gas conservation requirements limiting flaring into the atmosphere, or any combination of events including geological restrictions (such that it prohibits reinjection back into the producing formation) allows producers to continue to produce and sale unrestricted volumes of high value oil and natural gas liquids while simultaneously injecting natural gas into a producer's reservoir for storage. There are also benefits such as improved oil and HGL's recovery from injecting natural gas into hydrocarbon bearing reservoirs. The stored volumes of natural gas will be cycled out and sold later when pipeline capacity and other bottlenecks have been solved but will have received the benefit of further incremental hydrocarbons recovered from the storage reservoir (other than salt caverns and non-hydrocarbon bearing aquifers).

Figure 1A:
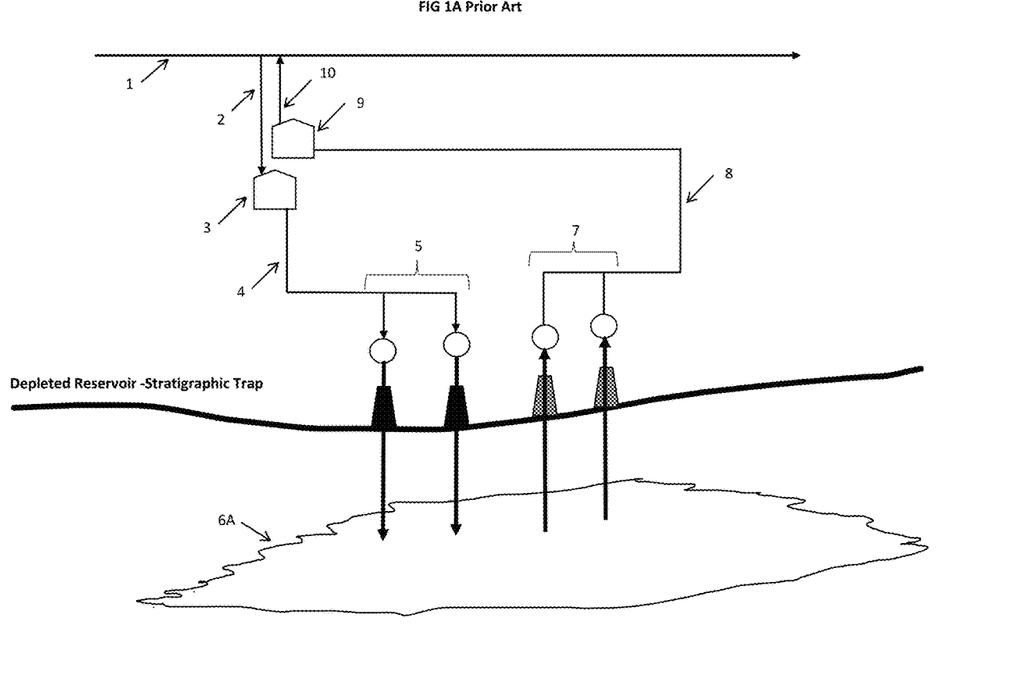
FIG. 1A-D are schematic diagrams that represent the typical prior art used to compress gas for storage in the typical types of storage reservoirs.
Figure 1B:
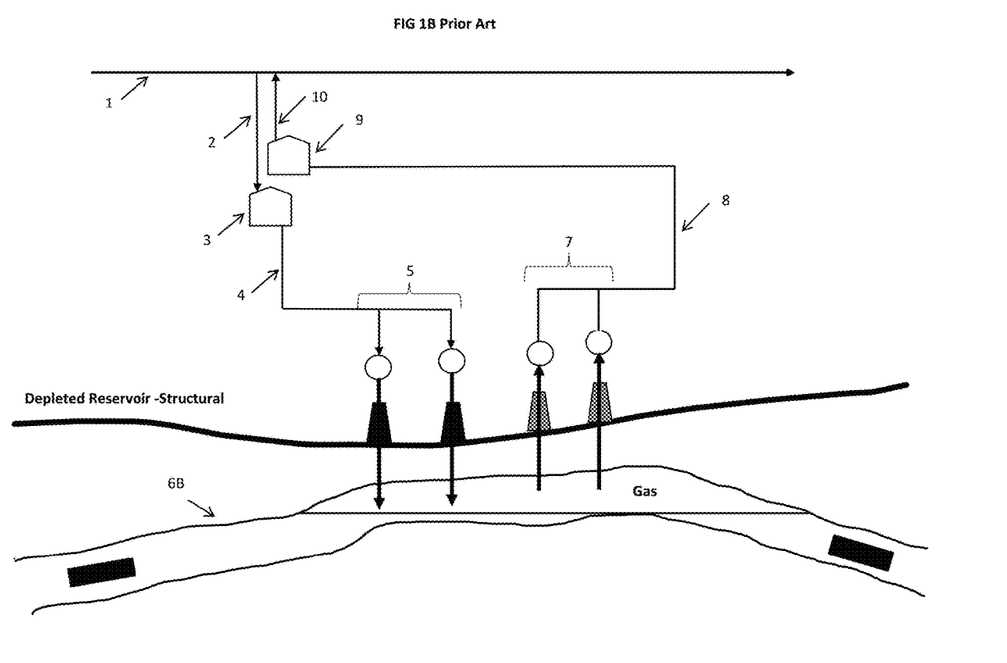
Figure 1C:
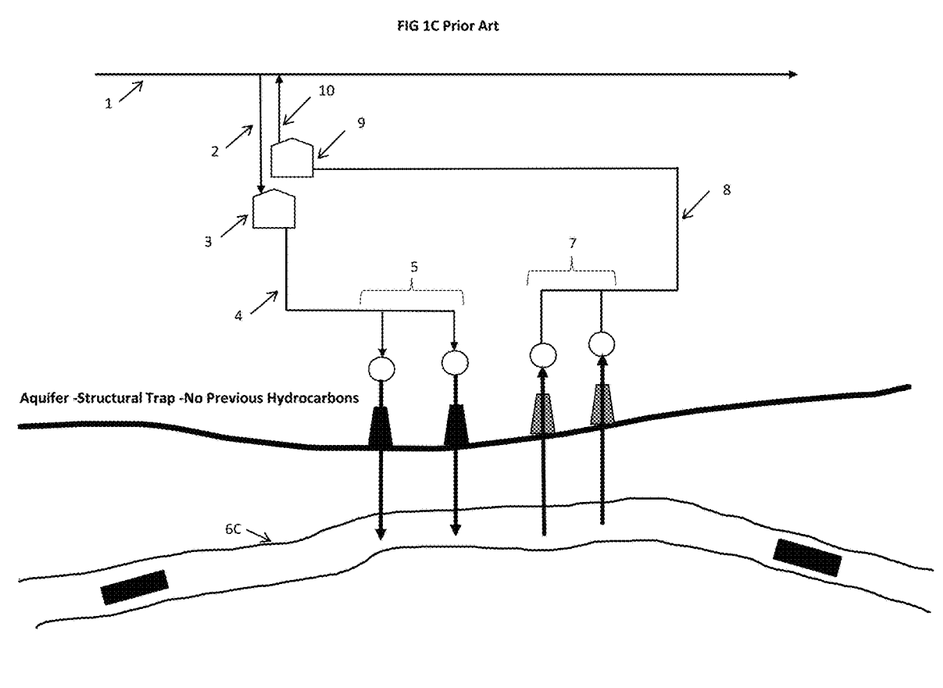
Figure 1D:
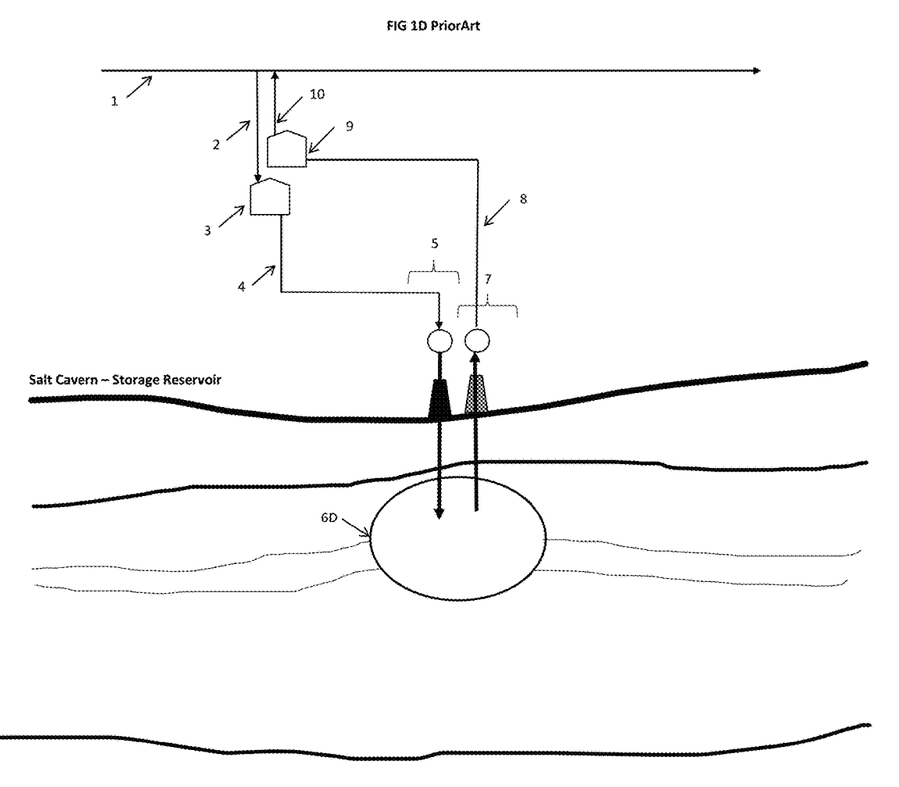
Figure 2:
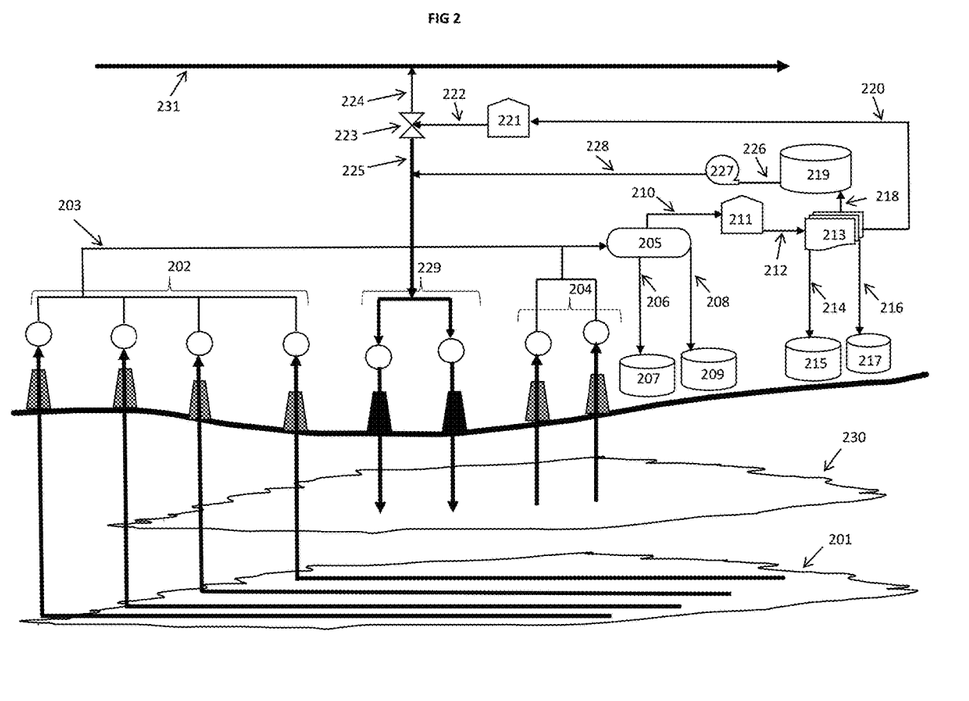
FIG. 2 is a schematic diagram illustrating variable volume single action flow splitter in one embodiment of the of the present invention.

FIG. 2 illustrates a schematic diagram of a variable volume single action flow splitter in one embodiment of the of the present invention. Gas is supplied from a producing oil or gas field 201, from producing wells 202 and 204 stream 203 enters the inlet separator 205, where the oil 206 enters a storage and sales tank 207 and the free condensate 208 enters a storage and sales tank 209 and the gas and entrained natural gas liquids stream 210 enters suction where it is compressed 211 and discharged through line 212 into a choke or gas processing plant 213. The stream received in 213 is processed by cooling the stream into 214 condensate enters storage and sales tank 215 and the butane 216 enters storage and sales tank 217 and Y grade liquids 218 enters storage and sales tank 219. The remaining stream exists to line 220 suction where it is compressed 221 and exits to line 222 and the stream enters the variable volume flow splitter 223 and exits into the sales line and metering station 224 and into the main gathering or transmission sales pipeline 231; or the injection side of the flow splitter, where the stream goes into line into line 225 with or without Y grade liquids variable volumes form line 226 injected by multi phase injection pump 227 entering through line 228 into well or wells 229 for storage in a separate independent reservoir 230.

It is highly desirable to inject natural gas and natural gas liquids back into a depleted or depleting reservoir with lower injection pressures in addition to the intrinsic value of the storage, as natural gas and HGL's act as a solvent which increases the recovery of oil and natural gas liquids left behind in an abandoned or producing field. In addition, by injecting, storing and cycling natural gas and HGL's into and out of an oil and or gas field, with or without supplemented volumes purchased or swapped from another source as described in FIG. 4 increases the reservoir's pressure and can recover an additional 20 to 100 percent recovery of oil and HGL's left behind in the reservoir.

Figure 3:
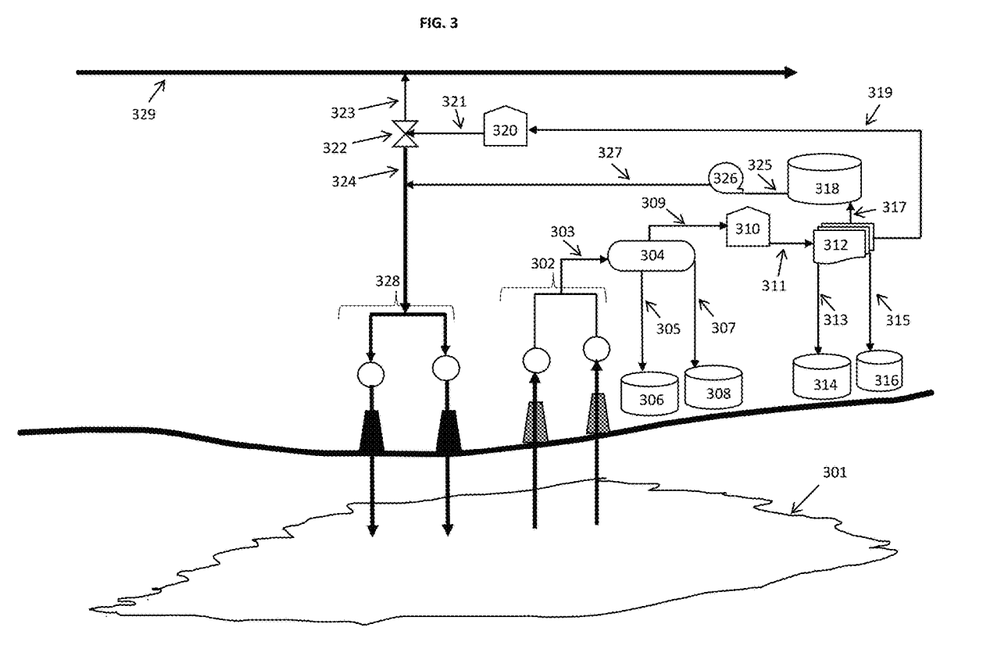
FIG. 3 is a schematic diagram illustrating a variation of an embodiment of the present invention.

FIG. 3 illustrates a schematic diagram of a variable volume single action flow splitter in an embodiment of the of the present invention. Gas is supplied from a producing oil or gas field 301, from producing wells 302 stream 303 enters the inlet separator 304, where the oil 305 enters a storage and sales tank 306 and the free condensate 307 enters a storage and sales tank 308 and the gas and entrained natural gas liquids stream 309 enters suction where it is compressed 310 and discharged through line 311 into a choke or gas processing plant 312. The stream received in 312 is processed by cooling the stream into 313 condensate enters storage and sales tank 314 and the butane 315 enters storage and sales tank 316 and Y grade liquids 317 enters storage and sales tank 318. The remaining stream exists to line 319 suction where it is compressed 320 and exits to line 321 and enters the variable volume flow splitter 322 and exits into the sales line and metering station 323 and into the main gathering or transmission sales pipeline 329 or; the injection side of the flow splitter, the stream goes into line 324 with or without Y grade liquids variable volumes form line 325 injected by multi phase injection pump 326 entering through line 327 into well or wells 328 for storage in the same producing reservoir 301.

It is highly desirable to inject natural gas and natural gas liquids back into the producing reservoir in addition to use as storage natural gas and HGL's act as a solvent which increases the recovery of oil and natural gas liquids in a producing field. Further, and in addition by injecting and storing natural gas and HGL's produced back into the producing oil and or gas field, with or without supplemented volumes purchased or swapped from another source as described in FIG. 4, maintains the reservoir's pressure and supports an additional 20 to 100 percent recovery of oil and HGL's that are normally left behind in the reservoir. Using a producing reservoir as storage also adds the intrinsic value of the storage through being able to take advantage of price arbitrage without the costs associated with third party storage.

Figure 4:
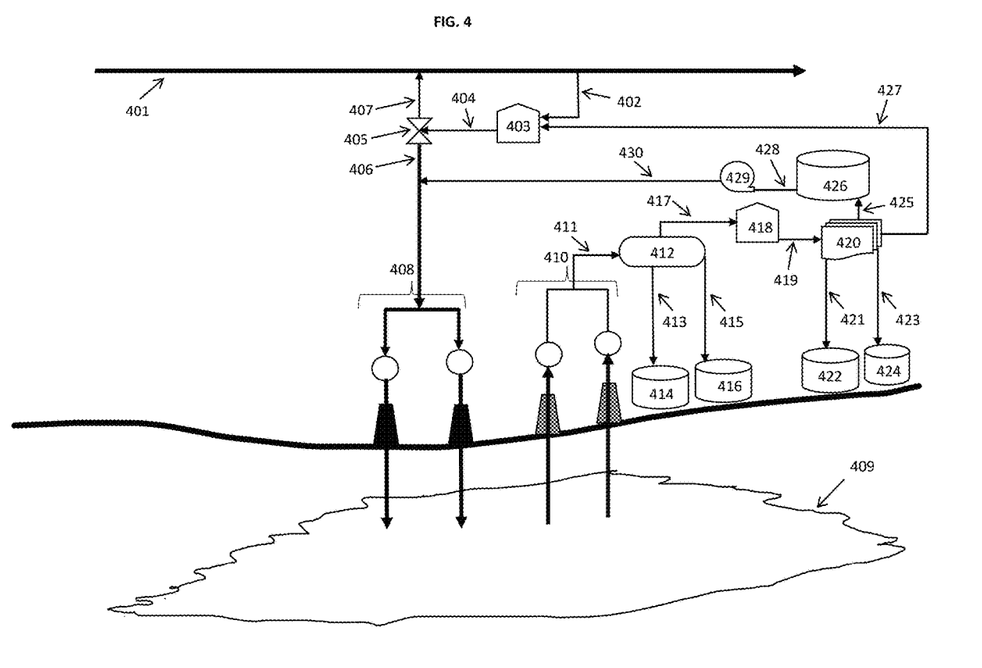
FIG. 4 is a schematic diagram illustrating another variation on the embodiment of the present invention.

FIG. 4 illustrates a schematic diagram of a variable volume single action flow splitter in other embodiments of the of the present invention. Gas is supplied (supplemental or not to 409) from a main gas gathering or transmission line 401 and stream 402 enters suction where it is compressed 403 and discharged into line 404 and enters the variable volume flow splitter 405 and simultaneously or at a later date after storage exits into the sales line 407 into the main gathering or transmission sales line 401 or; the injection side of the flow splitter stream line 406 with or without Y grade liquids variable volumes form line 428 injected by multi phase injection pump 429 entering through line 430 into well or wells 408 for storage in the same producing and or depleted reservoir 409. The stored and or cycled gas exits from wells 410 stream 411 enters the inlet separator 412, where the oil 413 enters a storage and sales tank 414 and the free condensate 415 enters a storage and sales tank 416 and the gas and entrained natural gas liquids stream 417 enters suction where it is compressed 418 and discharged through line 419 into a choke or gas processing plant 420. The stream received in 420 is processed by cooling the stream into 421 condensate enters storage and sales tank 422 and the butane 423 enters storage and sales tank 424 and Y grade liquids 425 enters storage and sales tank 426. The remaining stream exists to line 427 suction where it is compressed 403 and exits to line 404 and enters the variable volume flow splitter 405 and exits into the sales line 407 and into the main gathering or transmission sales pipeline 401. The injection side of the flow splitter, the stream goes into line 406 with or without Y grade liquids variable volumes form line 428 injected by multi phase injection pump 429 entering through line 430 into well or wells 408 for storage in the producing or depleted reservoir 409.

It is highly desirable to inject natural gas and natural gas liquids back into a depleted or depleting reservoir in addition to the intrinsic value of the storage as natural gas and natural gas liquids act as a solvent which increases the recovery of oil and natural gas liquids left behind in an abandoned or producing field. By injecting, storing and cycling natural gas and HGL's produced back into and out of the oil and or gas field, with supplemented volumes, increases the reservoir's pressure and can recover an additional 20 to 100 percent recovery of oil and HGL's left behind in the reservoir from pressure depletion.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

Although the present invention has been described in terms of various embodiments, it is not intended that the invention be limited to these embodiments. It will be apparent to one skilled in the art that modifications may be made to the illustrated embodiments without departing from the spirit and scope of the invention. The scope of the present invention is defined by the claims that follow.

What is claimed is:

1. A system for selectively storing and selling a gas stream, the gas stream comprising of at least one of natural gas and natural gas liquids, the system comprising:
   a sales transmission line for transporting the gas stream from a plurality of sources to market;
   at least one producing field, the at least one producing field containing an extractable supply of the gas stream;
   a compressor, in fluid communication with both the at least producing field and the sales transmission line; the compressor operable to compress the gas stream received;
   a variable volume flow splitter in fluid communication with the compressor, the variable volume flow splitter operable to selectively divide the gas stream into a first volume of the gas stream and a second volume of the gas stream; and
   wherein the first volume of the gas stream is diverted into the sales transmission line and the second volume of the gas stream is diverted into the at least one producing field.

2. The system of claim 1, wherein the at least one producing field is one of a producing natural gas field, a producing oil field, a depleted natural gas field and a depleted oil field.

3. The system of claim 1, further comprising an additional supply of the gas stream, the additional supply being produced from the at least one producing field and added to increase the second volume of the gas stream downstream of the variable volume flow splitter.

4. The system of claim 1, wherein the variable volume flow splitter is operable to be adjusted manually, thereby adjusting the ratios between the first volume of the gas stream and the second volume of the gas stream.

5. The system of claim 1, wherein the variable volume flow splitter is operable to be adjusted remotely, thereby adjusting the ratios between the first volume of the gas stream and the second volume of the gas stream.

6. The system of claim 1, wherein the variable volume flow splitter is operable to be adjusted remotely in response to a pricing signal received over the Internet, thereby adjusting the ratios between the first volume of the gas stream and the second volume of the gas stream.

7. The system of claim 1, further comprising a metering station operable to measure the first volume of the gas stream being supplied to the sales transmission line.

8. The system of claim 1, further comprising a metering station operable to measure the first volume of the gas stream being supplied to the sales transmission line and automatically receive at least one of shipping information and accounting information.

9. The system of claim 1, further comprising a controller operable to control the variable volume flow splitter and adjust the size of the first volume of the gas stream relative to the second volume of the gas stream based, at least in part, upon a signal indicative of a unit price for the gas stream.

10. The system of claim 1, further comprising a controller operable to control the variable volume flow splitter and adjust the size of the first volume of the gas stream relative to the second volume of the gas stream based, at least in part, upon a signal indicative of injection pressure measured in the producing field.

11. A method for selectively storing and selling a gas stream, the gas stream comprising at least one of natural gas and natural gas liquids the method comprising:
   receiving at a compressor, a first supply of the gas stream from a sales transmission line operable to transport the gas stream from a plurality of sources to market;
   receiving at the compressor, a second supply of the gas stream extracted from a producing field;
   compressing the first supply of the gas stream and the second supply of the gas stream at the compressor;
   using a variable volume flow splitter, splitting the first supply of the gas stream and the second supply of the gas stream compressed by the compressor into a first volume of the gas stream and a second volume of the gas stream; and
   wherein the first volume of the gas stream is diverted into the sales transmission line and the second volume of the gas stream is diverted into the at least one producing field.

12. The method of claim 11, wherein the at least one producing field is one of a producing natural gas field, a producing oil field, a depleted natural gas field and a depleted oil field.

13. The method of claim 11, further comprising adding an additional supply of the gas stream to the second volume of the gas stream, the additional supply being produced from the at least one producing field and added to the second volume of the gas stream downstream of the variable volume flow splitter.

14. The method of claim 11, wherein the variable volume flow splitter is adjusted manually, thereby adjusting the ratios between the first volume of the gas stream and the second volume of the gas stream.

15. The method of claim 11, wherein the variable volume flow splitter is adjusted remotely, thereby adjusting the ratios between the first volume of the gas stream and the second volume of the gas stream.

16. The method of claim 11, wherein the variable volume flow splitter is adjusted remotely in response to a pricing signal received over the Internet, thereby adjusting the ratios between the first volume of the gas stream and the second volume of the gas stream.

17. The method of claim 11, further comprising measuring, at a metering station, the first volume of the gas stream being supplied to the sales transmission line.

18. The method of claim 11, further comprising measuring, at a metering station, the first volume of the gas stream being supplied to the sales transmission line and automatically receive at least one of shipping information and accounting information.

19. The method of claim 11, further comprising using a controller to control the variable volume flow splitter and adjust the size of the first volume of the gas stream relative to the second volume of the gas stream based, at least in part, upon a signal indicative of a unit price for the gas stream.

20. The method of claim 11, further comprising using a controller to control the variable volume flow splitter and adjust the size of the first volume of the gas stream relative to the second volume of the gas stream based, at least in part, upon a signal indicative of injection pressure measured in the producing field.

* * * * *